United States Patent
Madsen et al.

(10) Patent No.: US 12,250,026 B2
(45) Date of Patent: Mar. 11, 2025

(54) PHOTON NUMBER RESOLVING METHODS AND SYSTEMS

(71) Applicant: XANADU QUANTUM TECHNOLOGIES INC., Toronto (CA)

(72) Inventors: Lars Madsen, Toronto (CA); Fabian Laudenbach, Toronto (CA); Jonathan Lavoie, Toronto (CA)

(73) Assignee: XANADU QUANTUM TECHNOLOGIES INC., Toronto (CA)

( * ) Notice: Subject to any disclaimer, the term of this patent is extended or adjusted under 35 U.S.C. 154(b) by 311 days.

(21) Appl. No.: 17/994,953

(22) Filed: Nov. 28, 2022

(65) Prior Publication Data

US 2023/0198632 A1 Jun. 22, 2023

Related U.S. Application Data

(60) Provisional application No. 63/291,071, filed on Dec. 17, 2021.

(51) Int. Cl.
*H04B 10/00* (2013.01)
*H04B 10/70* (2013.01)
*H04J 14/00* (2006.01)

(52) U.S. Cl.
CPC ................. *H04B 10/70* (2013.01)

(58) Field of Classification Search
CPC .................... H04B 10/70; G01J 2001/442
See application file for complete search history.

(56) References Cited

U.S. PATENT DOCUMENTS

| | | | |
|---|---|---|---|
| 2013/0275054 A1* | 10/2013 | Simpson | G01J 1/42 702/26 |
| 2021/0025757 A1* | 1/2021 | Yamamoto | G01J 3/4406 |
| 2022/0137244 A1* | 5/2022 | Radtke | H01L 31/107 250/338.4 |

* cited by examiner

*Primary Examiner* — Daniel G Dobson
(74) *Attorney, Agent, or Firm* — Norton Rose Fulbright Canada LLP

(57) ABSTRACT

A photon-number resolving (PNR) method and system are described. A PNR detector is calibrated to generate a characteristic pulse plot for each of a plurality of unique photon numbers. A generic tail portion is also stored. A signal is then detected through the PNR detector. The signal includes at least a first pulse and a second pulse, where the second pulse at least partially overlaps with the first pulse. The first photon number of the first pulse may be determined. Then, the characteristic pulse plot that corresponds to the first photon number is subtracted from the first pulse, such that the second photon number of the second pulse may be determined with minimized interference from any signal overlap. The generic tail portion may be scaled and subtracted from any identified stray events to minimize interference of stray signals from unintended light sources.

20 Claims, 9 Drawing Sheets

PHOTON NUMBER RESOLVING METHODS AND SYSTEMS

RELATED APPLICATIONS

This claims the benefit of U.S. Provisional Patent Application No. 63/291,071, filed Dec. 17, 2021, the entire contents of which are incorporated by reference herein.

TECHNICAL FIELD

The present application relates to quantum optics, and in particular to performing photon number detection.

BACKGROUND

In the field of quantum optics, photon detectors are needed for detecting the number of photons present in a pulse of light radiation. For multi-photon states, conventional single photon detectors, such as avalanche photodiodes (APDs) and photomultiplier tubes (PMT's), lack the photon number resolving capability due to their "dead time" effect, the time after each detection event during which the system is not able to record another event. Photon number resolving (PNR) detectors offer the capability to accurately characterize the number of incident photons in an incident light pulse.

Additionally, PNR detectors have an important role in the field of quantum optics particularly in relation to the transition from Gaussian to non-Gaussian resources. The non-Gaussian resources, be it states, operations, or measurements, are essential or at least advantageous for many applications, such as quantum computation, quantum error correction, or quantum communication. PNR detectors' ability to discriminate between states with different photon numbers allow them to be used for non-Gaussian quantum state preparation as well as for deterministic implementation of important non-Gaussian operations.

When a few-photon pulse arrives at a PNR detector, such as a transition-edge sensor (TES) based PNR detector, it creates a time-domain voltage waveform with a characteristic shape that corresponds to the photon number. The waveform includes a rising edge portion, a main body portion and a decaying tail portion. The voltage waveform may be digitized and processed to extract the photon number based on the characteristic shape.

In some instances, if a second pulse arrives before the characteristic waveform of a first pulse has decayed, resulting in overlap of the waveforms of both pulses and mutual distortion, it may lead to miscounts. Therefore, PNR detectors have traditionally been operated with photon pulses well separated (i.e. a second pulse is not received until a first pulse is fully or near fully decayed) in the time domain and thus serving as a bottleneck to PNR detector operational speed.

Further, unintended light reaching a PNR detector may also cause miscounts, also referred to as stray counts, which limits the signal to noise ratio (SNR) of the PNR. While steps may be taken to suppress the effect of unintended light sources, it may be difficult to completely avoid it.

Accordingly, it is desirable to provide an improved method and system of processing PNR detector signals that may be operated with a pulsed photon source, such as a laser source, with higher pulse-repetition rate (i.e. 100 kHz to 500 kHz) and more resilient against unintended light interference.

SUMMARY OF THE INVENTION

In one aspect, there is provided a photon number resolving method and system wherein a PNR detector is calibrated to generate a set of characteristic plots, one for each photon number. A light signal is detected by the PNR detector, where the signal includes a pulse train with at least a first pulse and a second pulse that at least partially overlap with each other. The overlap of the first and second pulse may cause miscount in the photon number. A first photon number is determined for the first pulse using any suitable method, such as area, PCA, or dot product, based on the duration before the arrival of the second pulse. Based on the determined first photon number, the corresponding characteristic plot generated during the calibration phase is subtracted from the first pulse, such as by subtracting the values point by point. After subtraction, the first pulse is effectively removed from the plot, thereby minimizing the overlap between the first and the second pulse. Then a second photon number for the second pulse may be determined with minimized interference from the first pulse.

In a further aspect, a stray tail subtraction may be performed before each pulse to minimize any interference stemming from unintended light sources. Specifically, a standard deviation for a 0-photon number state is determined. Then any pulse signal prior to an actual pulse that exceeds a threshold value (e.g. four standard deviations from the 0-photon number state) is deemed as a stray event. The stray event pulse values are then normalized to the individual pulse signal. In some embodiments, the stray tails subtraction is performed for signal voltage values in a time window before a pulse to minimize interferences that may cause miscount.

Even though the present disclosure describes the photon number resolving method and system with respect to a two-pulse pulse train, it is understood that the disclosure may be extended to pulse trains with three or more pulses.

According to a first example aspect, there is a photon-number resolving (PNR) method comprising: calibrating a PNR detector to generate a characteristic pulse plot for each of a plurality of photon numbers; receiving, by the PNR detector, a signal including a first pulse and a second pulse, where the second pulse at least partially overlaps with the first pulse; determining a first photon number of the first pulse; subtracting a characteristic plot that corresponds to the first photon number from the first pulse of the received electrical signal plot; determining a second photon number of the second pulse; and storing the first and second photon numbers.

According to a second example aspect, there is a photon number resolving (PNR) system comprising: a PNR detector configured to detect photons in a pulse of light generated from a light source; a signal processor configured to: calibrate the PNR detector to generate a characteristic pulse plot for each of a plurality of photon numbers; receive a detected signal from the PNR detector including a first pulse and a second pulse, where the second pulse at least partially overlaps with the first pulse; determine a first photon number of the first pulse; subtract a characteristic plot that corresponds to the first photon number from the first pulse of the received electrical signal plot; determine a second photon number of the second pulse; and store the first and second photon numbers.

Any of the above aspects may further include performing stray tail subtraction.

In any of the above aspects, the stray tail subtraction may be performed before the determining of the first photon number.

In any of the above aspects, the stray tail subtraction may be performed before the determining of the second photon number.

In any of the above aspects, performing stray tail subtraction may include: determining a stray event; and reducing disturbance caused by the stray event by subtracting a tail portion obtained from the characteristic wave plots from the received signal.

In any of the above aspects, the determining of the stray tail event may include: determining a standard deviation of a 0-photon number state of the received signal; and identifying a stray event when value of the received signal exceeds a threshold value. In some embodiments, the threshold value may be four (4) times the standard deviation.

In any of the above aspects, the tail portion may be a second half of a 2-photon number characteristic plot.

Any of the above aspects may further include: scaling the tail portion by an offset value.

In any of the above aspects, the offset value may be determined by: determining a mean value of the received signal; determining a mean value of a 0-photon number characteristic plot; and setting the offset value as a difference between the mean value of the received signal and the mean value of the 0 photon number characteristic plot.

In any of the above aspects, the characteristic pulse plot for each of the plurality of photon numbers may be generated from a high number of low repetition rate pulses received at the PNR detector.

In any of the above aspects, determining the first photon number may include area method, principal component analysis (PCA), and dot product method.

In any of the above aspects, determining the second photon number may include area method, principal component analysis (PCA), and dot product method.

In any of the above aspects, the first and second pulses may be spaced apart by $\Delta t$ in time domain such that the PNR detector operates in a linear response region.

In any of the above aspects, the PNR detector may be a transition-edge sensor (TES) based PNR detector.

Any of the above aspects may further comprise a data acquisition system (DAQ) configured to detect and record the detected signal from the PNR detector, wherein the DAQ may further comprise an amplifier configured to amplify the detected signal from the PNR detector.

In any of the above aspects, the signal processor may be further configured to perform stray tail subtraction before determining the first photon number and before determining the second photon number.

In any of the above aspects, to perform the stray tail subtraction, the signal processor may be configured to: determine a stray event; and reduce disturbance caused by the stray event by subtracting a tail portion obtained from the characteristic wave plots from the received signal.

In any of the above aspects, to determine the stray tail event, the signal processor may be further configured to: determine a standard deviation of a 0-photon number state of the received signal; and identify a stray event when value of the received signal exceeds a threshold value. In some embodiments, the threshold value may be four (4) times the standard deviation.

In any of the above aspects, the signal processor may be further configured to scale the tail portion by an offset value, wherein the offset value is determined by: determine a mean value of the received signal; determine a mean value of a 0-photon number characteristic plot; and setting the offset value as a difference between the mean value of the received signal and the mean value of the 0-photon number characteristic plot.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Although some examples of the present disclosure are described in the context of photonics quantum signal detection and processing, the teachings of the present disclosure may be implemented in other forms of photonics systems including, for example, fibre optics, spectroscopy, LiDAR-based systems, and radiology in medical imaging.

Figure 1:
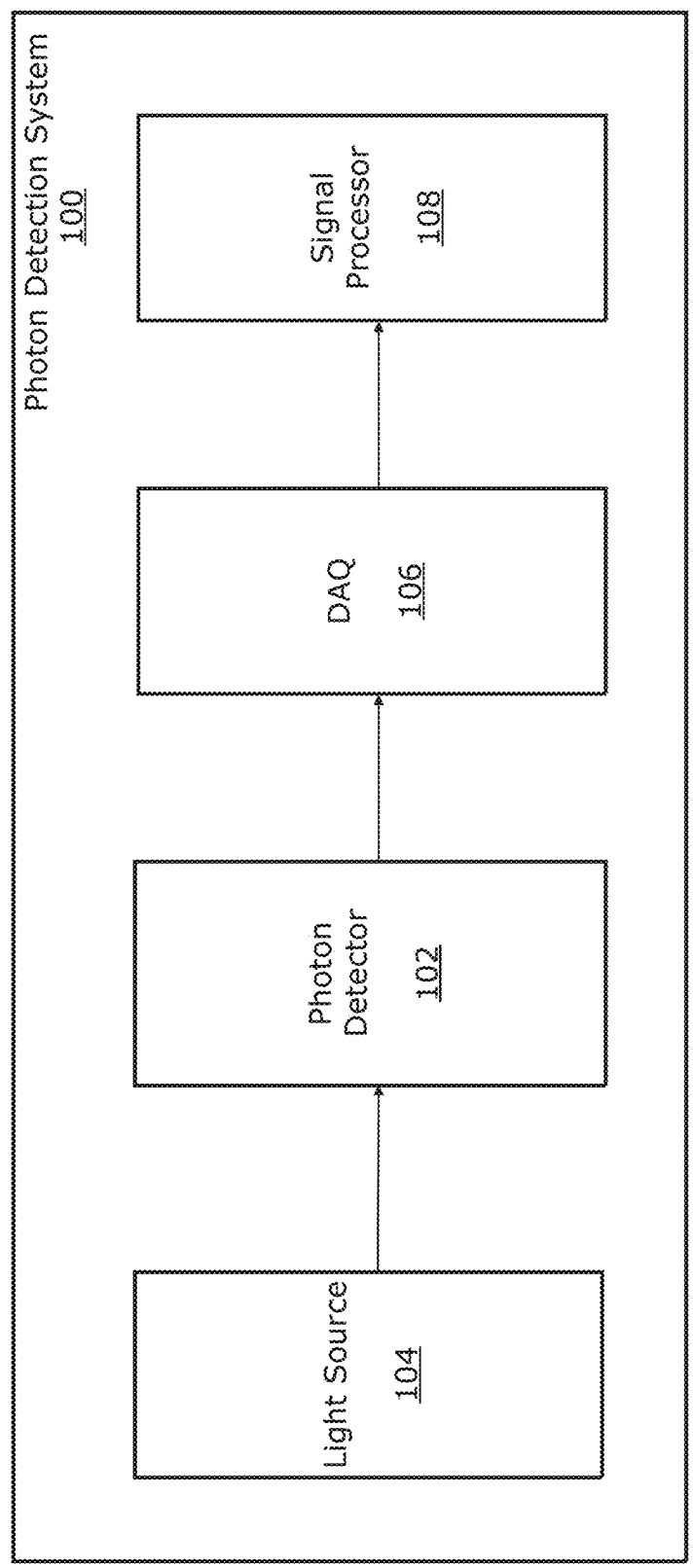
FIG. 1 illustrates a simplified block diagram of a photon detection system in accordance with an exemplary aspect of the present disclosure.

FIG. 1 is a block diagram illustrating certain components of an example photon detection system 100 including a PNR detector 102 in accordance with an embodiment of the present disclosure. The photon detection system 100 is configured to measure the photon number of an incoming light signal generated by a light source 104, which may include suitable optical components (not shown). Although shown as a component of photon detection system 100, it is understood that light source 104 may be located outside and separate of system 100 as an independent component or a subcomponent of another system. The light source 104 may, for example, be a pulsed photon source that is capable of generating faint laser pulse, or a resonator capable of generating squeezed light pulses or single-photon generating sources.

Upon absorption of the incident photons generated by the light source 104, the PNR detector 102 is configured to output an electrical pulse. The PNR detector 102 may be any photon detector that is capable of operating within a linear response region of the detector such as, for example, a transition-edge sensor (TES) based PNR detector, or any other appropriate detector. The detector 102 may be cooled to a superconducting state (i.e. in the order of tens or hundreds of milli-Kelvin) such that it has zero electrical resistances and hence zero voltage drop. The absorption of one or more photons causes a temperature change in the absorber of the detector 102, thereby increasing the resistivity of the detector leading to a voltage drop across the detector. The voltage drop may be proportional to the number of photons absorbed by the PNR detector 102.

The electrical signal outputted from the PNR detector 102 is then detected and recorded by a data acquisition system (DAQ) 106. The DAQ 106 may, for example, include a computing system (as described in more detail below) equipped with appropriate hardware circuit and software. In some embodiments, the DAQ 106 may include one or more amplifiers (not shown) to amplify the output electrical signals (i.e. voltage drop) of the PNR detector 102. In some embodiments, the electrical signal, with or without amplification, may be digitized through an analog-digital-converter (ADC) (not shown) such that the electrical signal readings are quantized into discrete digital quantities.

The recorded data from the DAQ 106 is then received by the signal processor 108, which is a software agent (e.g. a computer program) that comprises instructions that are executed by one or more computing systems. The signal processor 108 may include any number of independent or interconnected sub-modules. As used here, a "module" can refer to a combination of a hardware processing circuit and machine-readable instructions (software and/or hardware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. The signal processor 108 is configured to carry out the PNR signal processing method in accordance with embodiments of the present disclosure as described in more detail below.

Figure 2:
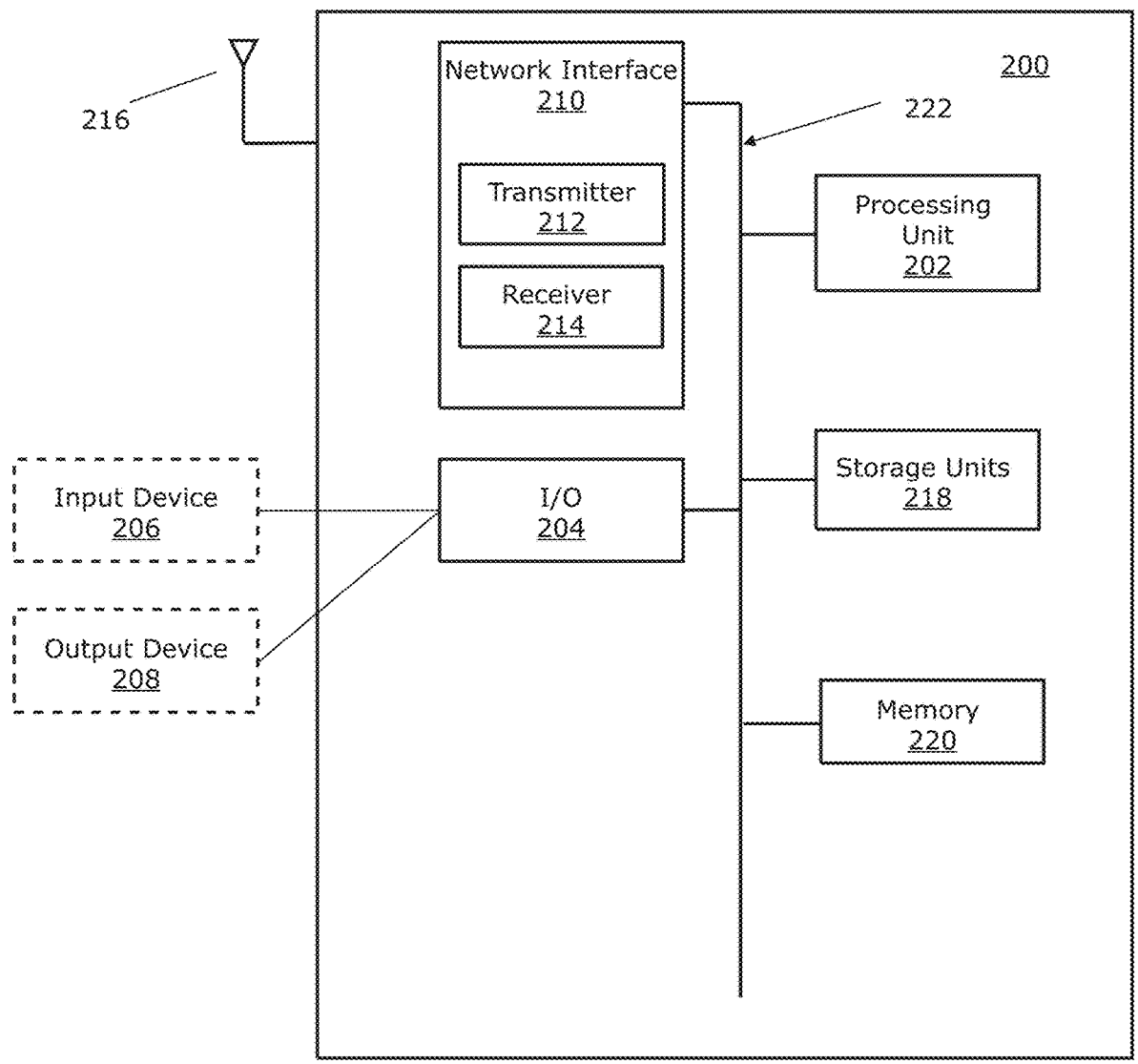
FIG. 2 illustrates a simplified block diagram of a computing system, which may be used to implement the signal processor in FIG. 1.

FIG. 2 illustrates a simplified block diagram of an exemplary embodiment of computing system 200, which may be used to implement the signal processor 108. Other computing systems suitable for implementing the methods and systems described in the present disclosure may be used, which may include components different from those discussed below. In some example embodiments, the computing system 108 may be implemented across more than one physical hardware unit, such as in a parallel computing, distributed computing, virtual server, or cloud computing configuration. Although FIG. 2 shows a single instance of each component, there may be multiple instances of each component in the classical computing system 200.

The computing system 200 may include one or more processing unit(s) 202, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 200 may also include one or more input/output (I/O) interfaces 204, which may enable interfacing with one or more appropriate input devices 206 and/or output devices 208. In the example shown, the input device(s) 206 (e.g., a keyboard, a mouse, a microphone, a touchscreen, and/or a keypad) and output device(s) 208 (e.g., a display, a speaker and/or a printer) are shown as optional and external to the computing system 200. In other examples, one or more of the input device(s) 206 and/or the output device(s) 208 may be included as a component of the computing system 200. In other examples, there may not be any input device(s) 206 and output device(s) 208, in which case the I/O interface(s) 204 may not be needed.

The computing system 200 may include one or more network interfaces 210 for wired or wireless communication with a network. In example embodiments, network interfaces 210 include one or more wireless interfaces such as transmitters 212 that enable communications in a network. The network interface(s) 210 may include interfaces for wired links (e.g., Ethernet cable) and/or wireless links (e.g., one or more radio frequency links) for intra-network and/or inter-network communications. The network interface(s) 210 may provide wireless communication via one or more transmitters 212 or transmitting antennas, one or more receivers 214 or receiving antennas, and various signal processing hardware and software. In this regard, some network interface(s) 210 may include respective processing systems that are similar to computing system 200. In this example, a single antenna 216 is shown, which may serve as both transmitting and receiving antenna. However, in other examples there may be separate antennas for transmitting and receiving.

The computing system 200 may also include one or more storage devices such as storage units 218, which may include a non-transitory storage unit such as a solid state drive, a hard disk drive, a magnetic disk drive and/or an optical disk drive. The storage devices of computing system 200 may include one or more memories 220, which may include a volatile or non-volatile memory (e.g., a flash memory, a random access memory (RAM), and/or a read-only memory (ROM)). The storage devices (e.g., storage units 218 and/or non-transitory memory(ies) 220) may store instructions for execution by the processing units(s) 202, such as to carry out the PNR signal processing methods of the present disclosure. The memory(ies) 220 may include other software instructions, such as for implementing an operating system or a quantum simulation system as disclosed herein and other applications/functions.

In some examples, one or more data sets and/or module(s) may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 222 providing communication among components of the computing system 200, including the processing units(s) 202, I/O interface(s) 204, network interface(s) 210, storage unit(s) 218, memory(ies) 220. The bus 222 may be any suitable bus architecture including, for example, a memory bus, a peripheral bus or a video bus.

Figure 3:
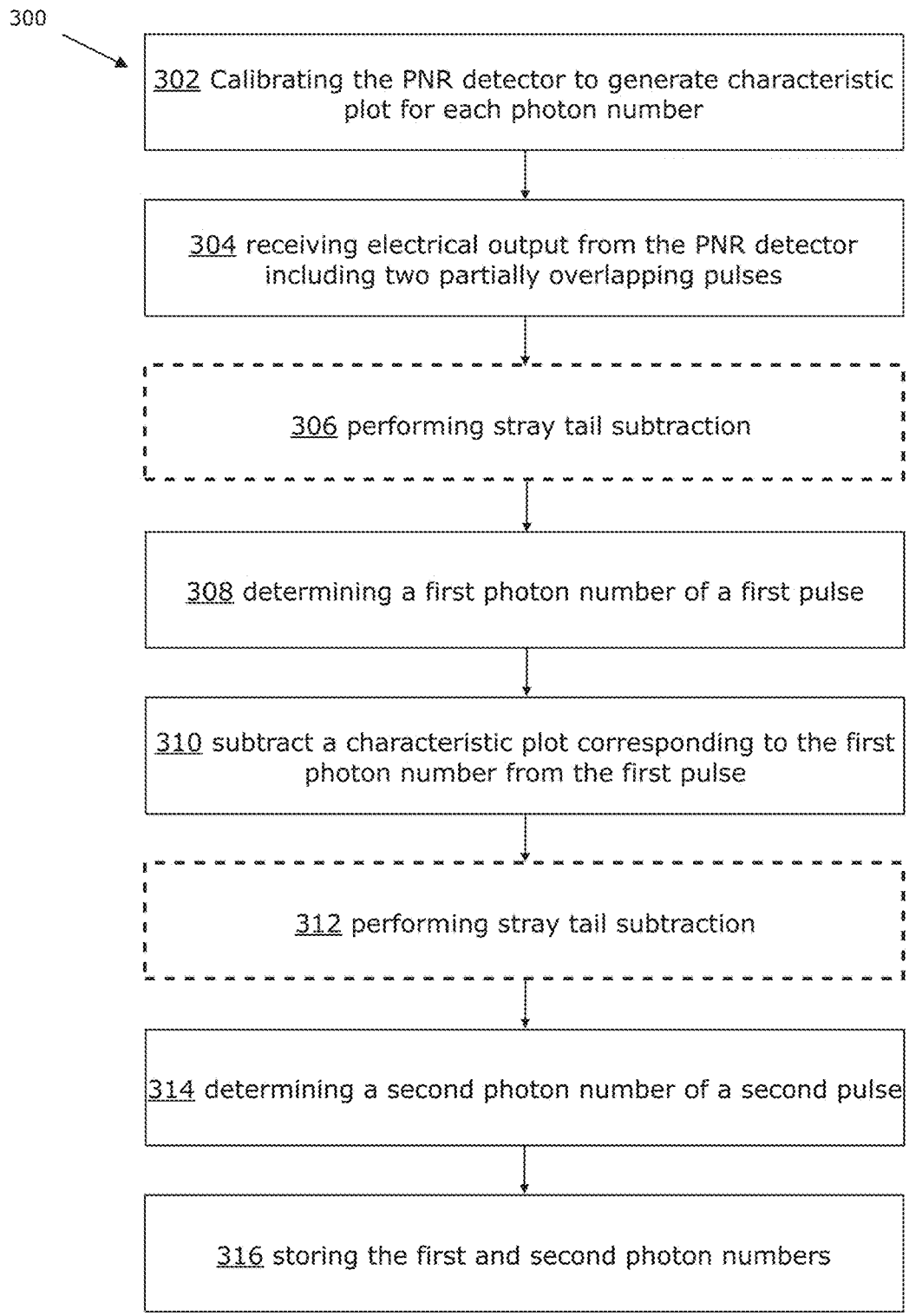
FIG. 3 illustrates a flowchart diagram of an example method of PNR signal processing performed by the signal processor 108 in accordance with an embodiment of the present disclosure.

FIG. 3 is a flowchart diagram illustrating an example method 300 for processing the PNR signal performed by the signal processor 108. At operation 302, the system 100 calibrates the PNR detector 102 to generate characteristic pulse plots for each unique photon number. The light source 104 generates a plurality of light pulses directed at the PNR detector 102. In example embodiments, the calibration is performed using a sufficiently high number (i.e. in sufficient number to contain pulses of each photon number in the order of 100's) of well separated pulses at a low repetition rate (i.e. in the range of 10 kHz to 100 kHz) so that the unique shape of all relevant photon numbers may be generated as characteristic plots and averaged in sufficient numbers to minimize noise impact. The calibration pulses are used to generate electrical output waveforms from the PNR detector 102 for each unique photon number. The photon number is identified in all the arriving pulses. The output waveforms for each photon number are then averaged. The average plot for each photon number is stored, such as in storage unit 218 or memories 220, as the characteristic waveform for a given photon number. In some embodiments, the average plot includes a plurality of discrete voltage values. The characteristic plots represent the unique response of the particular PNR detector 102 photon absorption.

Additionally, a generic tail portion of the characteristic plots are obtained. In some embodiments, the generic tail portion can be generated as the second half of a 2-photon number characteristic plot. It is understood that other methods of setting the tail portion may be suitable, including using the second half of other photon number plots as appropriate. An offset, defined as the difference between an average or mean value of the measured signal and the 0-photon number characteristic plot (i.e. the average or mean voltage value of the 0-phone number plot shown as 702 in FIG. 7), is subtracted from the generic tail portion values for scaling of the tail portion values.

Figure 4:
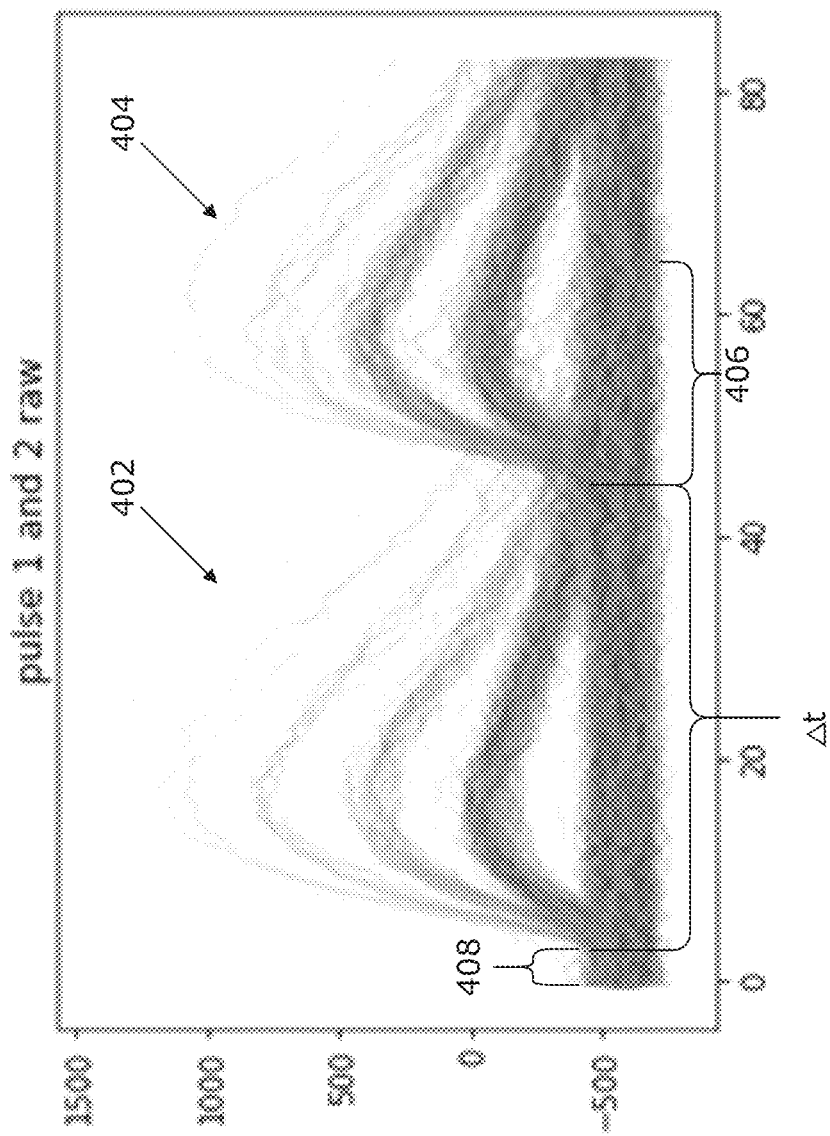
FIG. 4 illustrates an example pulse train plot generated by an example PNR detector.

At 304, light source 104 generates light pulses which are received by the PNR detector 102, which in turn outputs a corresponding electrical signal plot. The light pulses, including at least a first pulse and a second pulse, form a pulse train where the first pulse partially overlaps with the second pulse. An example pulse train detected by a PNR detector 102 is shown in FIG. 4, which includes 1000 digitized voltage signals outputted from a PNR detector 102 with an average of 0.3 photons per pulse. The X-axis denotes time in units of the 1/sampling rate, which is 15 MHz in this example. The Y-axis denotes the voltage value in units of milli-volts (mV)/2^15? Generally, the Y-axis is scaled proportional to the PNR signal. As shown in FIG. 4, a tail portion of the first pulse 402 overlaps with a rising edge portion of the second pulse 404 at 406. The overlap between two successive pulses may cause miscounts of the photon number for the later pulse. It is understood that the difference $\Delta t$ between two consecutive pulses, (i.e. first pulse 402 and second pulse 404), must be such that $\Delta t$ is equal to or greater than the time required for the PNR detector 102 to provide sufficient signal to noise ratio for the photon number in the first pulse 402 to be determined and recover into its linear response region. The $\Delta t$ is characteristic of the individual PNR detector and the photon pulse.

Figure 5:
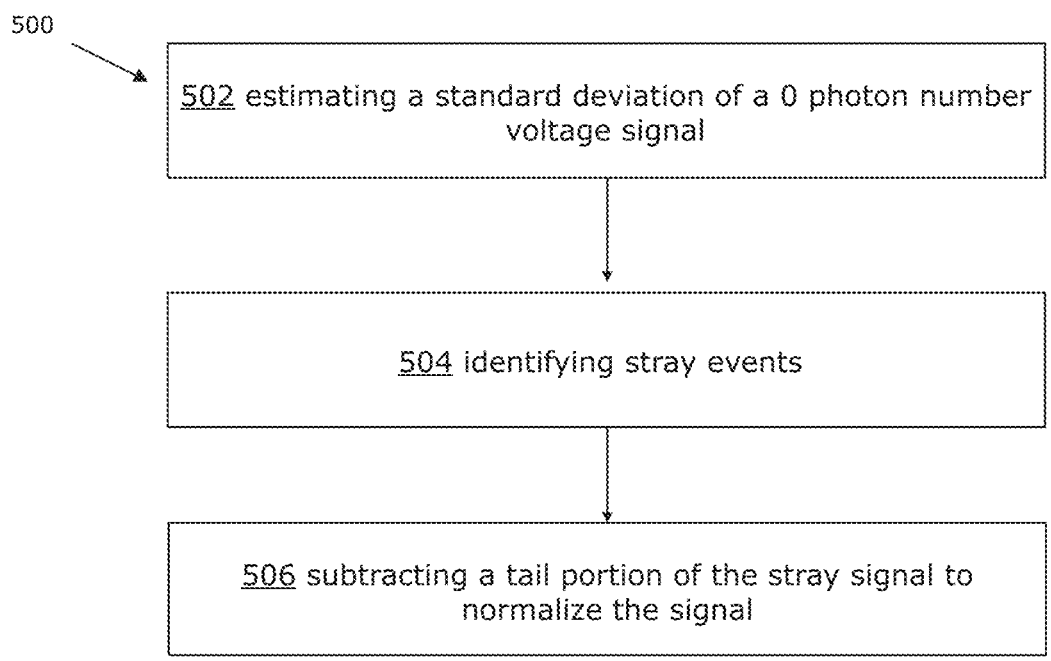
FIG. 5 illustrates a flowchart diagram of an example method of stray tail subtraction in accordance with one embodiment of the present disclosure.

Referring back to FIG. 3, optionally at 306, stray tail subtraction may be performed to minimize interference on the first pulse photon number determination that stems from unintended lighting sources, such as environmental or natural light. In cases where interference from unintended light sources is negligible, the stray tail subtraction may not be applied. FIG. 5 shows a flowchart diagram illustrating an example method 500 of stray tail subtraction in accordance with the present disclosure.

At 502, the standard deviation of the 0-photon number voltage signal is determined as the standard deviation of the signal at 408. The determination of the standard deviation σ may be made at any point in time where the photon number is 0 prior to or after the signal pulses, or from a pre-calibrated value. In some exemplary embodiments, the 0-photon number standard deviation may be calculated as:

$$\sigma^2 = \frac{1}{N-1} \sum_{i=0}^{N-1} (x_i - \mu)^2,$$

where N is the pulse iteration variable, and μ is the mean value of the 0-photon number voltage. N should be high (in one example, 100k), to avoid statistical noise.

At 504, the system identifies whether a signal is a stray event by determining whether the signal value exceeds a threshold value. In some embodiments, the threshold value is four (4) standard deviations of the 0-photon number threshold in the region 408 for the first pulse 402 as shown in FIG. 4, and region 802 for the second pulse and best shown in FIG. 8.

Figure 6:
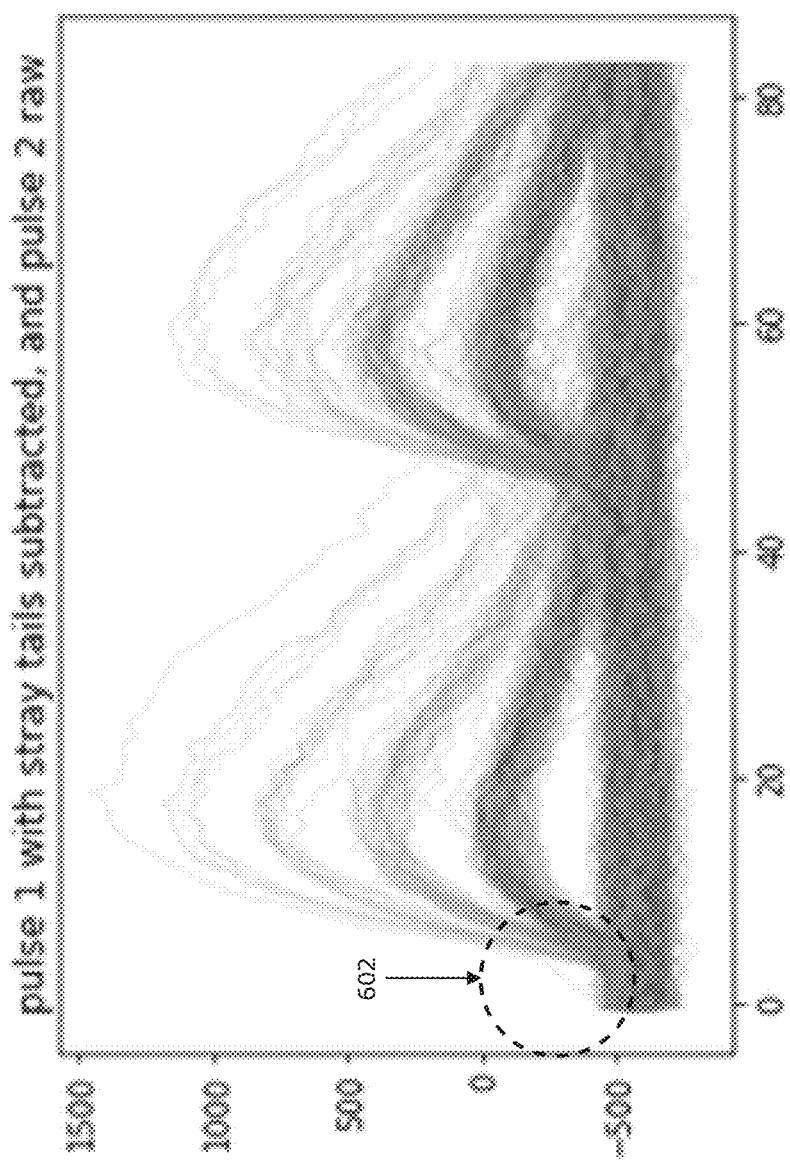
FIG. 6 illustrates the plot of FIG. 4 after stray tail subtraction performed before the first pulse.

At 506, for each identified stray event, the height of the generic tail portion determined during the calibration phase at 302 is normalized to the individual voltage signal. In the exemplary embodiment shown in FIG. 4, the mean value of the detected voltage value is approximately −100 and begins at time=0, which is 400 units (in this case mV*2^15) above the mean value of the 0-photon number characteristic plot at −500. Accordingly, the generic tail portions values are then vertically scaled up by an offset value of 400 mv/2^15 and subtracted point by point from the detected signal. The process is also referred to as "stray tail subtraction". FIG. 6 illustrates the result of stray tail subtraction being applied before the first pulse 402 shown in FIG. 4. As may be noted, the amount of stray signal is reduced near area 602 just prior to the arrival of the first pulse 402. In some embodiments, the height of the stray signal is determined within a time window prior to the arrival of the signal pulse. For example, the time window may be 10% of $\Delta t$. In the illustrated example shown in FIG. 6, with a sampling frequency of 15 MHz, the windows used to determine signal height for the stray tail subtraction may be approximately 5 nanoseconds (ns) before the arrival of the first pulse 402.

Referring back to FIG. 3, at 308, the signal processor 108 determines a photon number of the first pulse 402. The photon number of the first pulse may be determined via any suitable method including, for example, by the area method where the area under the signal plot is mapped to the area of the characteristic plot, principal component analysis (PCA), and by the dot product method where a dot product of the signal trace and a normalized unique shape is used to estimate the photon number. It is understood that any other suitable method for estimating photon number based on TES detector output may be applied.

Figure 7:
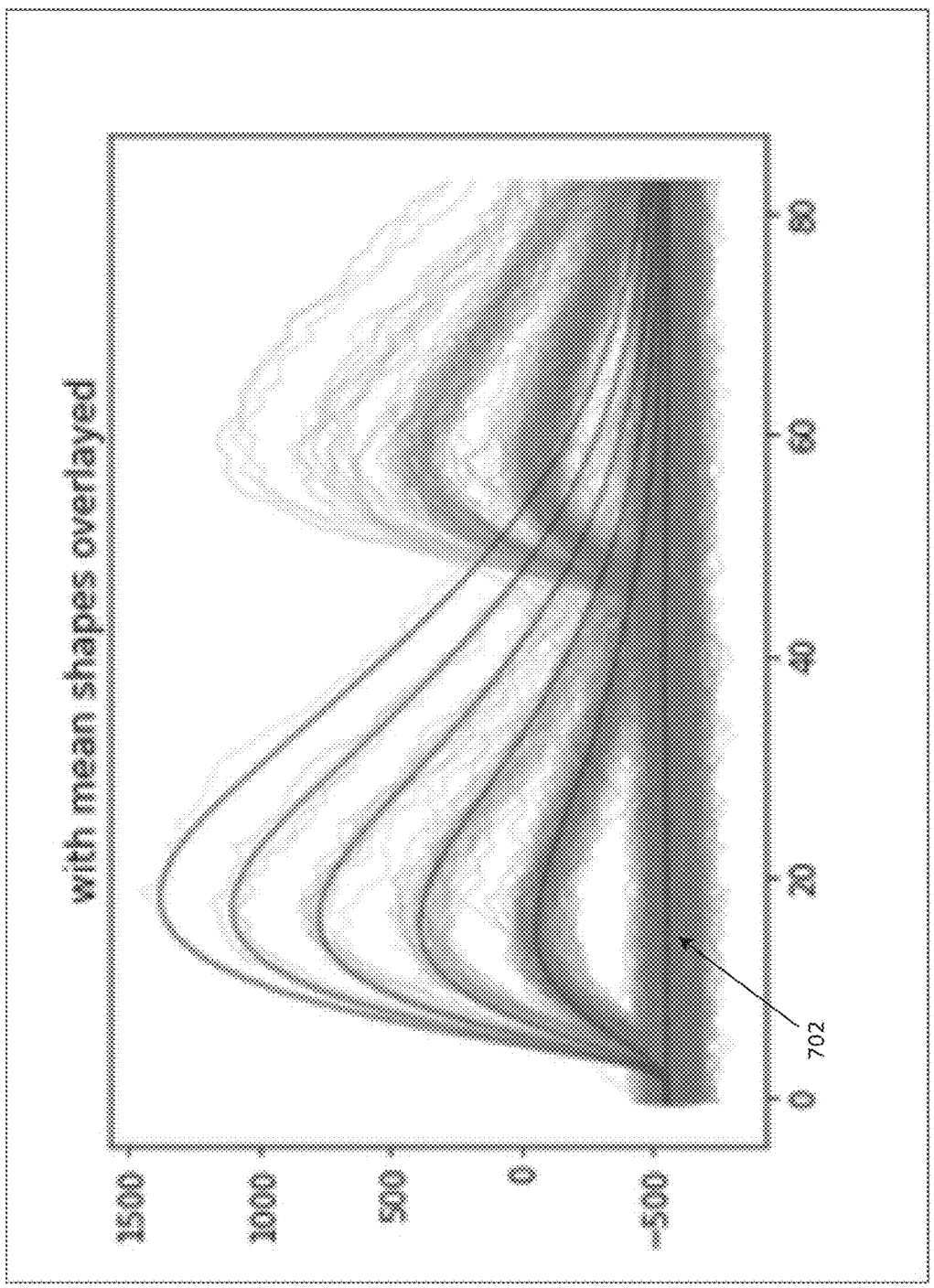
FIG. 7 illustrates the characteristic plot of the PNR detector generated during calibration overlaid over the plot of FIG. 6.
Figure 8:
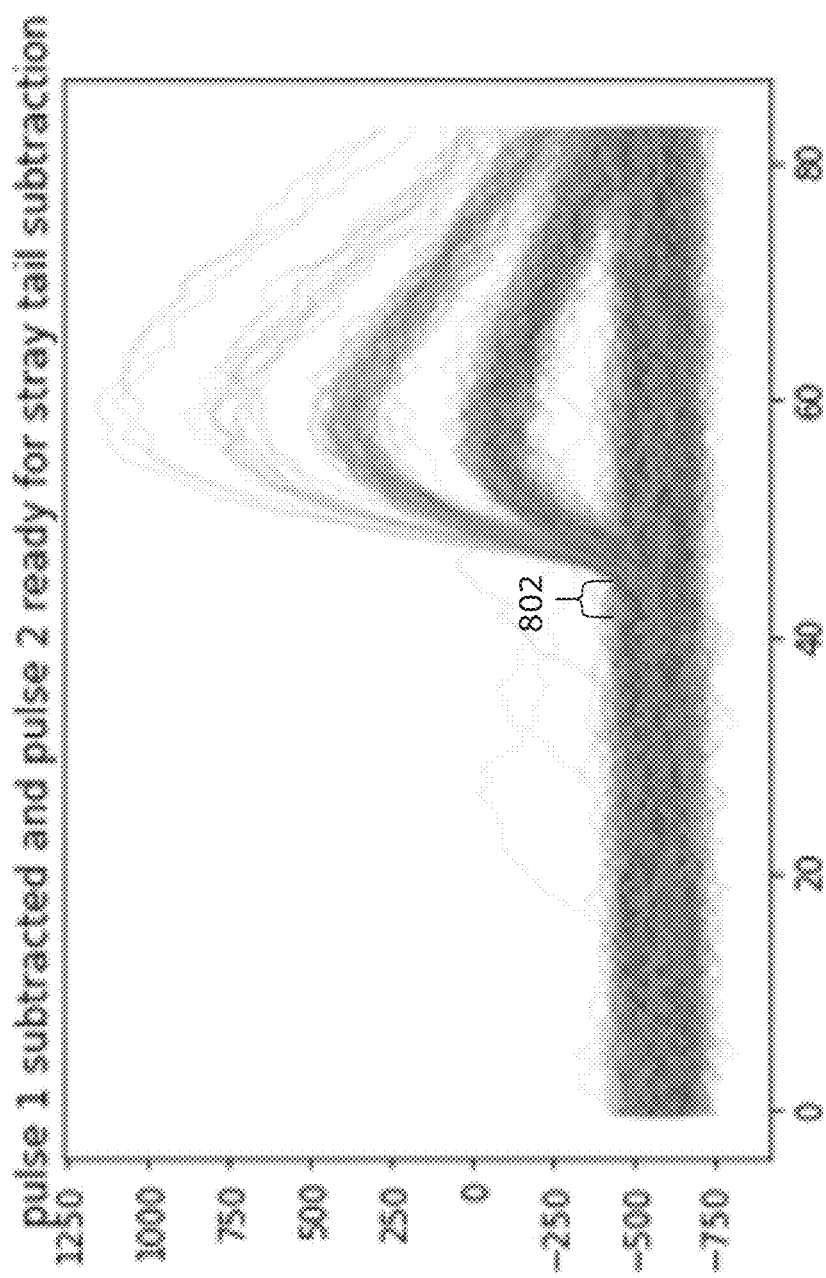
FIG. 8 illustrates the plot of FIG. 7 after subtracting the characteristic plot values from the values of the plot in FIG. 6.

At 310, the characteristic plot that corresponds to the first photon number is subtracted from the first pulse of the received electrical signal plot. In some embodiments, the characteristic plot is overlayed over the first pulse 402 as best shown in FIG. 7, which shows the characteristic plot of the PNR detector generated during the calibration phase overlayed on top of the plot in FIG. 6. In FIG. 7, the characteristic plots are shown in darker solid lines. The bottom characteristic plot line 702 denotes the 0-photon number state, and each of the successive characteristic plot lines denotes states with increasing photon numbers. The values of the overlaid plot may be subtracted, for example point by point, from the first pulse values of the received electrical signal plot. By way of a non-limiting example, if step 308 determines a first photon number of 2 in the first pulse, then the characteristic plot for 2-photons is subtracted from the received signal plot. FIG. 8 shows the plot of FIG. 7 after the characteristic plot values are subtracted from the first pulse 402. Each detected photon number plot line subtracts the values of the closest characteristic plot. The subtraction effectively removes the first pulse 402 so that its impact, particularly any overlapping with the second pulse 404 may be minimized.

Figure 9:
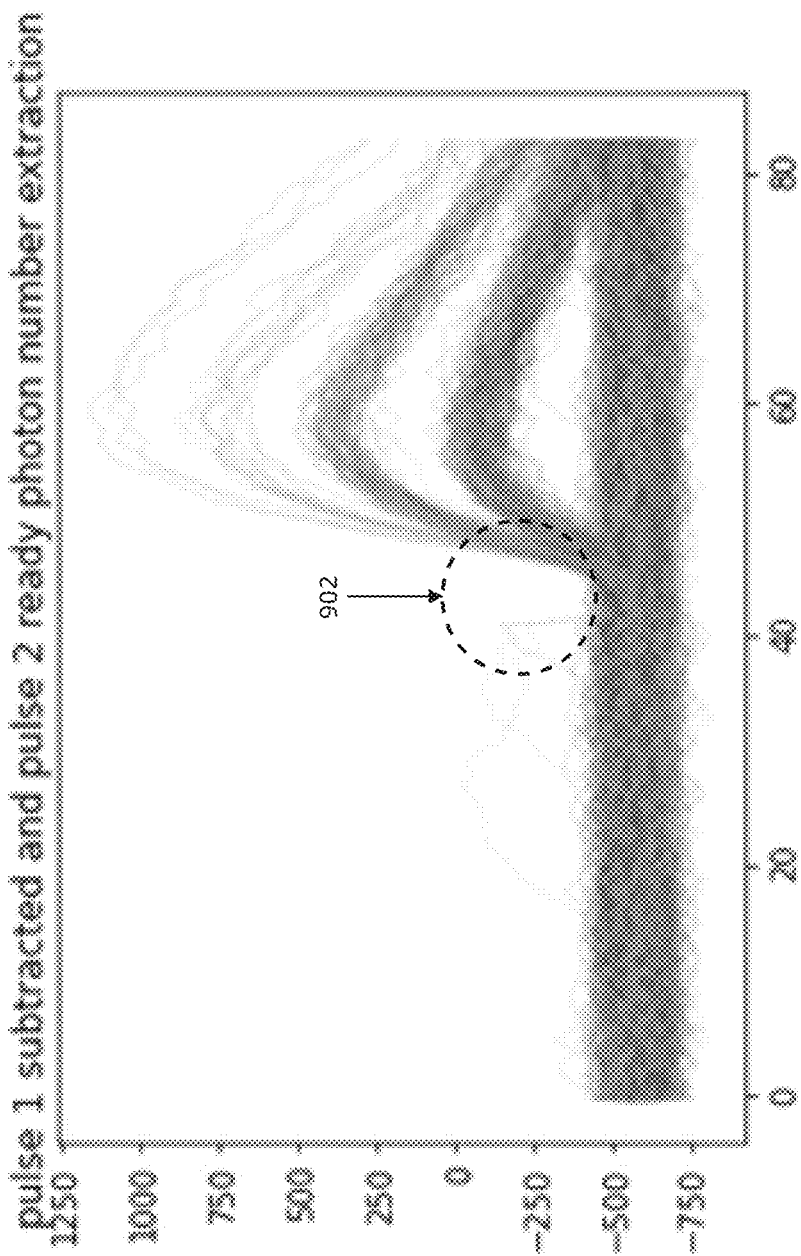
FIG. 9 illustrates the plot of FIG. 8 after stray tail subtraction before the second pulse.

Optionally, at 312, stray tail subtraction may be performed to minimize interference on the second pulse that stems from unintended lighting sources, such as environmental or natural lighting sources. Operation 312 may be carried out by performing method 500 similar to operation 306. FIG. 9 illustrates a plot of the second pulse from FIG. 8 after stray tail subtraction. As may be discerned through a comparison with FIG. 8, the stray signal interference just prior to the arrival of the second pulse 404 near area 902, is minimized.

At 314, the digital processor 108 determines a photon number of the second pulse 404. The photon number of the second pulse 404 may be determined with minimized signal overlap with the first pulse 402, thus minimizing the likelihood of miscount. Operation 314 may be performed via any suitable method including, for example, by matching area under the signal trace, principal component analysis (PCA), or by using a dot product of the signal trace and a normalized unique shape to estimate the photon number. It is understood that any other suitable method for estimating photon number based on TES detector output may be applied. In some embodiments, the method of photon number determination for the first pulse and second pulse are similar and may be implemented by the same software sub-module in digital processor 108.

At 316, after the photon number of the second pulse 404 is determined, the first and second photon numbers may be stored in storage units 218 or memory 220. The stored photon numbers may be displayed to the user via output device 208, such as a monitor display, or used for other modules or elements of another system.

Although the present disclosure describes the photon number resolving method and system with respect to a two-pulse pulse train, it is understood that the disclosure may be extended to pulse trains with three or more pulses.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A photon-number resolving (PNR) method comprising:
calibrating a PNR detector to generate a characteristic pulse plot for each of a plurality of photon numbers;
receiving, by the PNR detector, a signal including a first pulse and a second pulse, where the second pulse at least partially overlaps with the first pulse;
determining a first photon number of the first pulse;
subtracting a characteristic plot that corresponds to the first photon number from the first pulse of the received electrical signal plot;
determining a second photon number of the second pulse; and
storing the first and second photon numbers.

2. The PNR method of claim 1, further includes performing stray tail subtraction.

3. The PNR method of claim 2, wherein the stray tail subtraction is performed before the determining of the first photon number.

4. The PNR method of claim 2, wherein the stray tail subtraction is performed before the determining of the second photon number.

5. The PNR method of claim 2, wherein performing stray tail subtraction includes:
determining a stray event; and
reducing disturbance caused by the stray event by subtracting a tail portion obtained from the characteristic wave plots from the received signal.

6. The PNR method of claim 5, wherein the determining of the stray tail event includes:
determining a standard deviation of a 0-photon number state of the received signal; and
identifying a stray event when value of the received signal exceeds a threshold value.

7. The PNR method of claim 5, wherein the tail portion is a second half of a 2-photon number characteristic plot.

8. The PNR method of claim 5, further includes:
scaling the tail portion by an offset value.

9. The PNR method of claim 8, wherein the offset value is determined by:
determining a mean value of the received signal;
determining a mean value of a 0 photon number characteristic plot; and
setting the offset value as a difference between the mean value of the received signal and the mean value of the 0 photon number characteristic plot.

10. The PNR method of claim 1, wherein the characteristic pulse plot for each of the plurality of photon numbers are generated from a high number of low repetition rate pulses received at the PNR detector.

11. The PNR method of claim 1, wherein determining the first photon number includes area method, principal component analysis (PCA), and dot product method.

12. The PNR method of claim 1, wherein determining the second photon number includes area method, principal component analysis (PCA), and dot product method.

13. The PNR method of claim 1, wherein the first and second pulses are spaced apart by $\Delta t$ in time domain such that the PNR detector operates in a linear response region.

14. A photon number resolving (PNR) system comprising:
a PNR detector configured to detect photons in a pulse of light generated from a light source;
a signal processor configured to:
calibrate the PNR detector to generate a characteristic pulse plot for each of a plurality of photon numbers;
receive a detected signal from the PNR detector including a first pulse and a second pulse, where the second pulse at least partially overlaps with the first pulse;
determine a first photon number of the first pulse;
subtract a characteristic plot that corresponds to the first photon number from the first pulse of the received electrical signal plot;
determine a second photon number of the second pulse; and
store the first and second photon numbers.

15. The PNR system of claim 14, wherein the PNR detector is a transition-edge sensor (TES) based PNR detector.

16. The PNR system of claim 14 further comprises a data acquisition system (DAQ) configured to detect and record the detected signal from the PNR detector, wherein the DAQ further comprises an amplifier configured to amplify the detected signal from the PNR detector.

17. The PNR system of claim 14, wherein the signal processor is further configured to perform stray tail subtraction before determining the first photon number and before determining the second photon number.

18. The PNR system of claim 17, wherein to perform the stray tail subtraction, the signal processor is configured to:
determine a stray event; and
reduce disturbance caused by the stray event by subtracting a tail portion obtained from the characteristic wave plots from the received signal.

19. The PNR system of claim 18, wherein to determine the stray tail event, the signal processor is further configured to:
determine a standard deviation of a 0-photon number state of the received signal; and
identify a stray event when value of the received signal exceeds a threshold value.

20. The PNR system of claim 18, wherein the signal processor is further configured to scale the tail portion by an offset value, wherein the offset value is determined by:
determine a mean value of the received signal;
determine a mean value of a 0-photon number characteristic plot; and
setting the offset value as a difference between the mean value of the received signal and the mean value of the 0-photon number characteristic plot.

* * * * *